United States Patent
Jolly (10) Patent No.: US 8,514,171 B2
(45) Date of Patent: Aug. 20, 2013

(54) PORTABLE DEVICE FOR CONTROLLING INSTRUCTION EXECUTION BY MEANS OF ACTUATORS PLACED ON A REAR SURFACE

(76) Inventor: Patrice Jolly, Maisons-Laffitte (FR)

( * ) Notice: Subject to any disclaimer, the term of this patent is extended or adjusted under 35 U.S.C. 154(b) by 791 days.

(21) Appl. No.: 12/668,009

(22) PCT Filed: Jul. 4, 2008

(86) PCT No.: PCT/FR2008/000963
§ 371 (c)(1),
(2), (4) Date: Jan. 6, 2010

(87) PCT Pub. No.: WO2009/034242
PCT Pub. Date: Mar. 19, 2009

(65) Prior Publication Data
US 2011/0163945 A1    Jul. 7, 2011

(30) Foreign Application Priority Data
Jul. 9, 2007    (FR) ...................... 07 04958

(51) Int. Cl.
G09G 5/00    (2006.01)
(52) U.S. Cl.
USPC ........ 345/156; 345/157; 345/169; 455/556.1; 455/556.2; 455/566
(58) Field of Classification Search
USPC ................ 345/156–178, 184; 455/556, 575, 455/556.1, 556.2, 566
See application file for complete search history.

(56) References Cited

U.S. PATENT DOCUMENTS 6,909,424 B2 *   6/2005   Liebenow et al. ............. 345/169
7,088,342 B2 *   8/2006   Rekimoto et al. ............ 345/169
(Continued)

FOREIGN PATENT DOCUMENTS
CN    1356622 A      7/2002
EP    0 279 553 A2   8/1988
(Continued)

OTHER PUBLICATIONS
International Search Report, dated Jan. 15, 2009, corresponding to PCT/FR2008/000963.
(Continued)

Primary Examiner — Quan-Zhen Wang
Assistant Examiner — Jennifer Nguyen
(74) Attorney, Agent, or Firm — Christie, Parker & Hale, LLP (57) ABSTRACT

The invention relates to a device (D) for controlling the execution of instructions, that comprises: i) a receptacle (RP) that can be held by a user in at least one hand and has a rear surface (FAR) provided with rear actuators (AC); ii) a storing means (MS) capable of storing, for at least one application, a table of correspondence between at least one operation mode and a set of selected instructions associated with icons of relative positions defined according to a selected arrangement; and ii) control means (MC) for, in case an application operation mode is selected, determining the table corresponding thereto and associating the instructions contained in said table to actuation types of the rear actuators (AC) selected on the basis of the relative positions of icons respectively associated with these instructions, at least some of said icons being displayed on at least one screen (EC1) according to their selected arrangement so as to identify the relative positions, on the rear surface (FAR) of the rear actuators (AC) and of the selected actuation types and, in case of manual actuation according to one type of actuation of a rear actuator (AC), commanding the execution of the instruction associated with the type of actuation of said rear actuator (AC).

19 Claims, 8 Drawing Sheets

(56) References Cited

U.S. PATENT DOCUMENTS

| | | | |
|---|---|---|---|
| 7,859,514 B1 * | 12/2010 | Park | 345/156 |
| 2007/0247337 A1 * | 10/2007 | Dietz et al. | 341/22 |
| 2007/0268261 A1 * | 11/2007 | Lipson | 345/169 |
| 2008/0030474 A1 * | 2/2008 | Toyokura et al. | 345/169 |
| 2008/0172609 A1 * | 7/2008 | Rytivaara | 715/700 |

FOREIGN PATENT DOCUMENTS

| | | |
|---|---|---|
| WO | WO 2006/052175 A1 | 5/2006 |
| WO | WO 2006/067404 A2 | 6/2006 |
| WO | WO 2006/070283 A1 | 7/2006 |

OTHER PUBLICATIONS

Andrews, et al., "Upper/Lower Case and Keyboard Redefine Feature for Word Processor and Electronic Keyboard Character Translation Redefinition," IBM Technical Disclosure Bulletin, vol. 19, No. 8, Jan. 1977, pp. 2853-2855, XP002040068.

* cited by examiner

| | Left-hand region (L) | | | Right-hand region (R) | | | |
|---|---|---|---|---|---|---|---|
| Port | r-Retraction | a-Pressing | e-Extension | e-Extension | a-Pressing | r-Retraction | Port |
| A (index-plt) | B  - | G  / | T  + | Y  ( | H  ) | N  € | A |
| B (index-finger) | V  1 | F  2 | R  3 | U  ? | J  - | M  , | B |
| C (middle-finger) | C  4 | D  5 | E  6 | I  ! | K  ; | P  : | C |
| D (ring-finger) | X  7 | S  8 | Z  9 | o  @ | L  ' | alt-lock | D |
| E (little-finger) | W  * | Q  0 | A  # | =  % | caps | alt | E |

FIG. 8

| Output in "Alpha" mode | Cousin outputs, list of associated Special characters |
|---|---|
| 'A  #' | 'à' and 'â' |
| 'B  -' | '_' |
| 'E  2' | 'é', 'è', 'ê' and 'ë' |
| 'G  /' | '\' |
| 'H  )' | '>', ']' and '}' |
| 'I  !' | '¡' |
| 'O  @' | 'ô' |
| 'N  €' | '$', '¥' and '£' |
| 'U  ?' | 'ù' and 'û' |
| 'Y  (' | '<', '[' and '{' |

FIG. 9

| Right hand region (R) | | | |
|---|---|---|---|
| e-Extension | a-Pressing | r-Retraction | Part |
| Tools | Tab | Ctrl | B (index finger) |
| Go To | Alt-Gr | Alt | C (Middle finger) |
| Cust -D | Menu App | ⇧ Shift | D (Ring finger) |
| Cust -E | Menu ▤ | Fn | E (Little finger) |

FIG. 10 alphabetical     numerical     symbols

PORTABLE DEVICE FOR CONTROLLING INSTRUCTION EXECUTION BY MEANS OF ACTUATORS PLACED ON A REAR SURFACE

CROSS-REFERENCE TO RELATED APPLICATION

This application is a National Phase Patent Application and claims the priority of International Application Number PCT/FR2008/000963, filed on Jul. 4, 2008, which claims priority of French Patent Application Number 0704958, filed on Jul. 9, 2007.

The invention relates to electronic equipment intended to allow users to supply (or input) instructions that are to be carried out.

By "instruction" is meant here any type of command adapted to bring about at least one change to one or more images and/or alphanumeric characters (or symbols) which is or are displayed on at least one display screen, or controlling the emission of at least one sound, or triggering the sending or acquisition of data (or signals), optionally through waves (for example in the case of an infra-red remote control).

Moreover, the phrase "electronic equipment" refers here to any electronic (and possibly computer) equipment comprising at least actuators each associated with at least one instruction to be carried out, and means for controlling the execution of the instructions activated by the actuation of the actuators. This may be for example a man-machine interface (such as a peripheral of the keyboard type), a games console, a remote-control box for electronic equipment, a computer or a terminal (fixed or portable), optionally reinforced and/or waterproof, measuring equipment, an electronic book or dictionary, a multimedia content reader, or a personal digital assistant (or PDA), or even communications equipment such as a mobile (or cordless) telephone or satellite navigation apparatus.

In addition, the term "actuator" here denotes any element of a man-machine interface which, when actuated using at least one of the user's fingers, enables him to supply (or input) an instruction which is to be carried out (and therefore affects at least one item of electronic and/or computer equipment). It may therefore be a sensitive (or touch-responsive) key or zone, a push button, a trigger, a "mouse" (or one of its derivatives such as a trackball or touchpad), a scroll bar, a scroll wheel or a lever (or joystick), for example.

Numerous compact items of equipment such as mobile telephones or personal digital assistants (and their derivatives) comprise a miniature keypad which can only be used with the thumbs (or possibly the index fingers). Inputting alphanumeric characters therefore rapidly becomes a tricky operation. To avoid typing errors, the keys generally have to be operated with greater force than on a traditional keyboard, which is less comfortable for the user.

The keypad may also be virtual (represented in a touch zone or by a list of characters) which greatly reduces the effectiveness and comfort of typing, especially in the presence of surfaces with a vibrating effect or sound effects.

The invention relates more particularly to electronic and/or computer equipment that comprises a receptacle which a user may support with at least one hand and which has a front surface (optionally provided with at least a screen and/or front actuators) and a rear surface provided with rear actuators that may be actuated according to at least one type of actuation associated with an instruction that is to be carried out relating to at least one application.

Several devices of this type are designed for inputting using keys located on the rear surface of their housing or receptacle in order to act on the display provided by means of a screen located on the front surface of said receptacle. However, these devices require considerable practice and great agility on the part of the user and/or they lack flexibility in terms of the instructions provided and/or use an aid on the front surface that takes up too much space.

Thus, patent documents U.S. Pat. No. 6,297,752 and CN 1356622 describe the positioning, on the rear surface of a receptacle, of a keypad that has substantially the same number of keys as a standard keyboard but with a natural arrangement of the keys associated with the right and left hands. To enable the user to determine the rear key that has to be used and particularly its location, a scale representation of the respective positions and actions (or instructions) of the rear keys can be displayed on the screen on the front surface. This representation is then superimposed (or shown in "overlay") on the screen displaying the image of the application being used. The drawback of this solution is that the user quickly has to acquire sufficient agility and good coordination of the movements of the fingers over a substantial number of keys in a space that is not visible, in order to manage without a display of the representation of the rear keys.

The patent document WO 2006/067404 describes an input device using touch zones and/or keys with multiple positions (or types of actuation) which can be actuated using movements of the fingers (extension and retraction). The presence and respective positions of the fingers in the vicinity of the rear zones where the keys are located are detected in order to display on the front screen, in overlay, the possibilities offered by each finger position. The user can then select one of the options displayed by exerting greater pressure or removal of pressure with the finger that is positioned over the desired option. This requires great agility of the fingers owing to the fact that every finger can control up to eight positions (or types of actuation) of the same rear key between its positions of maximum retraction and maximum extension. Even though the device uses a front display to assist the user, this display is intended to palliate the complexity introduced by the number of choices open to each finger. However, it involves feeling one's way in order to arrive at the desired command.

The patent document WO 2006/052175 describes a device similar to the one described above. Here, the rear keys are equipped with a touch sensor and their representation and the positions of the keys on them are displayed on the front screen. This makes it possible to improve the accuracy and agility of typing. However, the means used to detect the positions of the fingers may prove expensive and superfluous if there are only a few rear keys and the sense of touch and intuitive positioning of the fingers are sufficient for the user to find his way around.

As none of the known solutions is entirely satisfactory, the invention aims to improve the situation.

To this end it proposes a dedicated device for controlling the execution of instructions and comprising a receptacle which the user can support with at least one hand and which comprises a front surface and a rear surface provided with rear actuators each arranged to be actuated in accordance with at least one type of actuation associated with an instruction that is to be carried out and relating to at least one application.

This control device is characterised in that it comprises:
  storage means tasked with storing, for at least one application, a correlation table between at least one operating mode and a set of selected instructions associated with icons of relative positions defined by a selected arrangement, and control means tasked on the one hand with identifying, once an operating mode of an application has been selected, the table that corresponds thereto in the storage means, then associating the instructions contained in this identified table with types of actuation of rear actuators selected according to the relative positions of the icons associated respectively with these instructions, at least some of these icons being displayed on at least one screen in accordance with their selected arrangement so as to represent (or image) the relative positions of the rear actuators on the rear surface and the associated types of actuation, and on the other hand, in the case of manual actuation, according to a type of actuation of a selected rear actuator, ordering the execution of the instruction associated with the type of actuation of this rear actuator.

The control device according to the invention may have other features which may be taken separately or in combination, specifically:

- the rear surface may comprise a first set of at least one rear actuator assigned to the fingers of the user's left hand;
  - the rear actuators of the first set may for example be placed one above the other on the rear surface in positions matched to the average natural positions of the fingers of the left hand;
- the rear surface may comprise a second set of at least one rear actuator assigned to the fingers of the user's right hand;
  - the rear actuators of the second set may for example be placed one above the other on the rear surface in positions matching the average natural positions of the fingers of the right hand;
- the storage means may store at least one correlation table sent by at least one local or remote application;
- the front surface may be provided with a first screen adapted to display the icons;
  - the first screen may also be adapted to display images and/or alphanumeric characters of the selected application;
- the front surface may also be provided with a second screen adapted to display images and/or alphanumeric characters of the selected application and optionally icons in certain operating modes (for example in the "context" mode);
- the front surface may be provided with printed static information (for example screen-printed and optionally backlit) representing the instruction icons associated with a subset of rear actuators in at least one operating mode of at least one application;
- each rear actuator may be designed to be actuated in accordance with at least one type of actuation selected from among at least a first type of actuation triggered by a substantially vertical action of a finger, a second type of actuation triggered by the extension of a finger, and a third type of actuation triggered by the retraction of a finger;
- at least some of the rear actuators may be provided with specific three-dimensional markings and/or a particular covering intended to differentiate them from one another and/or assist with the placing of the fingers;
- at least some of the rear actuators may be associated with at least one type of actuation subdivided into at least two actuation subtypes associated with different instructions (such as for example a single click, a double click or a long click);
- the front surface may be provided with at least one front actuator designed to be actuated in accordance with at least one type of actuation associated with an instruction;
- it may comprise a side surface provided with at least one side actuator designed to be actuated in accordance with at least one type of actuation associated with an instruction;
- at least one of the front actuators and side actuators may be tasked with controlling the movement of a mouse pointer or a cursor;
- one of the rear actuators, front actuators and side actuators may for example make it possible to select one operating mode from at least two operating modes selected from a group comprising at least one mode known as input (or "alpha") mode in which at least some of the instructions correspond to alphanumeric characters, a mode known as "context" in which at least some of the instructions correspond to actions pertaining to an application, and a mode known as "advanced" in which at least some of the instructions are suitable for allowing an at least temporary change in application and/or operating mode and/or display mode;
- one of the rear actuators, front actuators and/or side actuators may for example make it possible to associate instructions derived from the last instruction executed with at least some of the types of actuation associated with at least some of the rear actuators;
- it may constitute a peripheral of a piece of electronic (and/or computer) equipment.

The invention also proposes a piece of electronic (and/or computer) equipment comprising a control device of the type described hereinbefore.

Further features and advantages of the invention will become apparent from the detailed description that follows, and from the attached drawings, wherein:

FIG. 11 shows three examples of correlation sub-tables which correspond respectively to three sub-modes of the advanced mode, referred to as "alphabetic", "numeric" (or Num) and "symbol" (or Sym), FIG. 12 diagrammatically shows a first example of a display of icons representing the types of actuation of two groups of four rear actuators over the entire display screen, FIG. 13 diagrammatically shows a second example of a display of icons representing the types of actuation of two groups of four rear actuators within an application window, FIG. 14 diagrammatically shows an example of the use of a front actuator called View, FIG. 15 diagrammatically shows a first use of the invention for an application of sorting photos in the context mode and in the case of a non-relief display, FIG. 16 diagrammatically shows the first use of the invention in the case of a display in relief, FIG. 17 diagrammatically shows a second use of the invention for an application of inputting and/or rapidly looking up information in the context mode, and FIG. 18 diagrammatically shows the second use of the invention in the presence of inputting fields.

The attached drawings may not only serve to supplement the invention but in some cases may also contribute to its definition.

Figure 1:
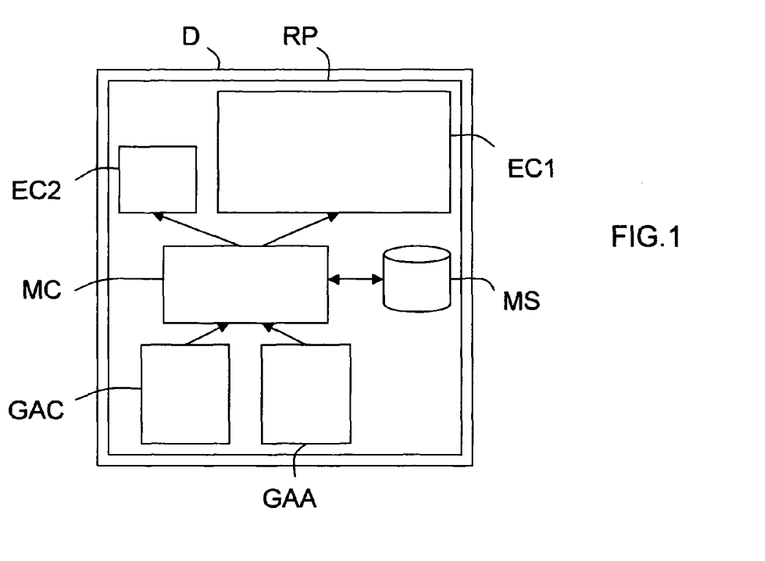
FIG. 1 shows in a highly diagrammatic and functional manner an embodiment of a control device according to the invention, FIG. 2 schematically shows an embodiment of the front surface of a control device according to the invention, FIG. 3 schematically shows an embodiment of the rear surface of a control device according to the invention.
Figure 2:
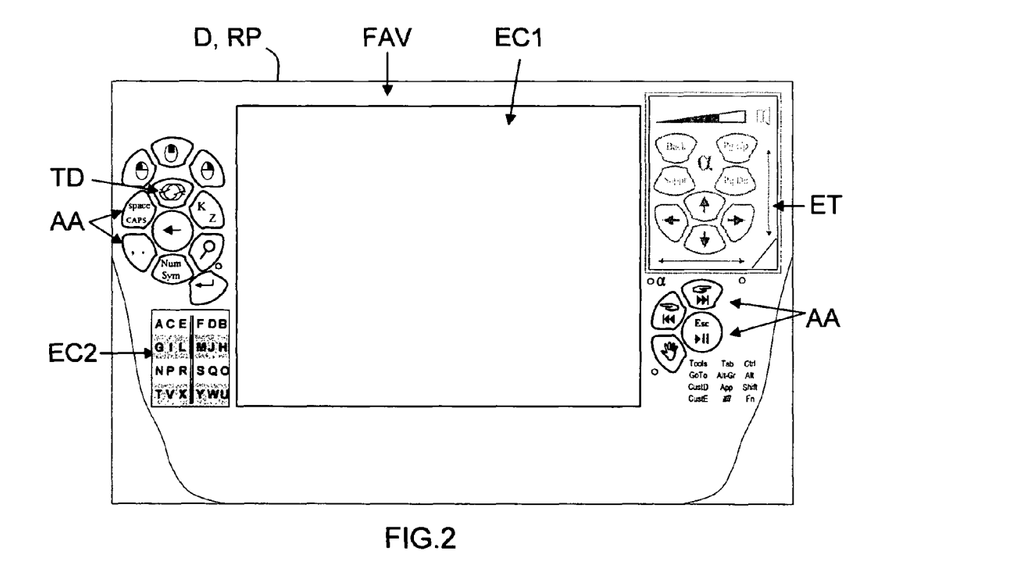
Figure 3:
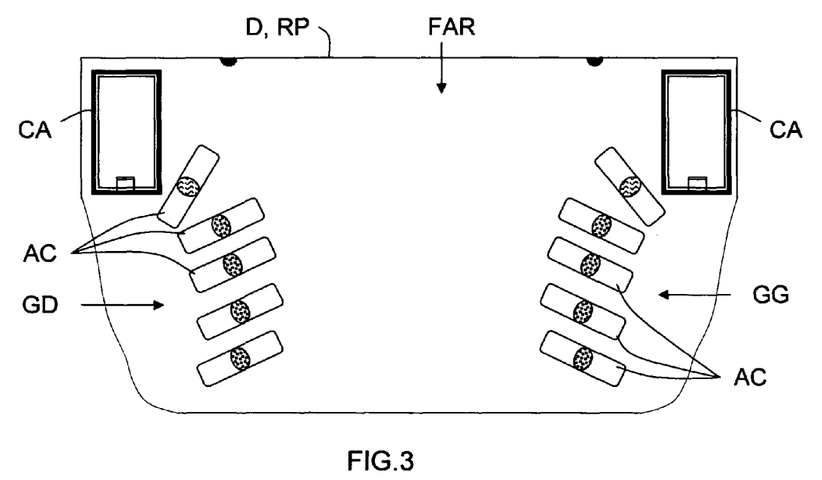
Figure 4A:
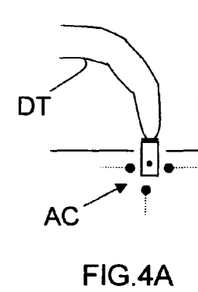
FIGS. 4A to 4D show in a highly diagrammatic manner a first embodiment of a rear actuator for four different positions of the same finger.
Figure 4B:
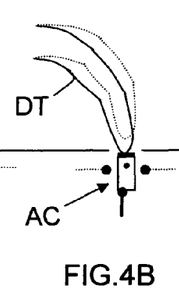
Figure 4C:
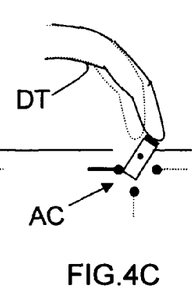
Figure 4D:
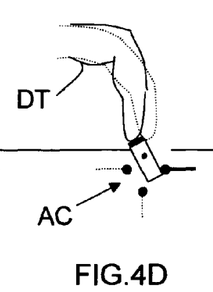
Figure 5A:
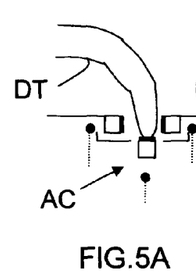
FIGS. 5A to 5D show in a highly diagrammatic manner a second embodiment of a rear actuator for four different positions of the same finger.
Figure 5B:
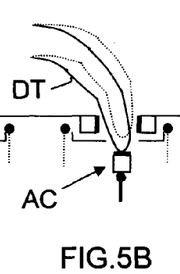
Figure 5C:
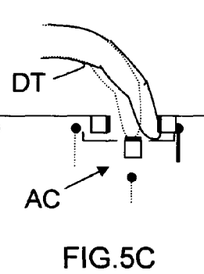
Figure 5D:
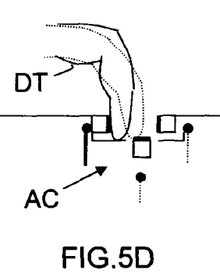
Figure 6A:
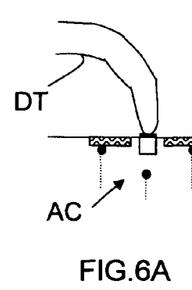
FIGS. 6A to 6D show in a highly diagrammatic manner a third embodiment of a rear actuator for four different positions of the same finger, FIG. 7 diagrammatically shows an example of the arrangement of two sets of rear actuators on the rear surface, and the references of the types of actuation associated with each of these rear actuators.
Figure 6B:
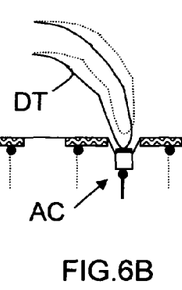
Figure 6C:
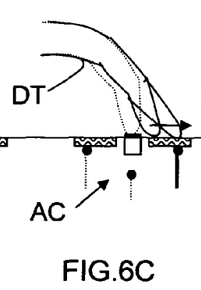
Figure 6D:
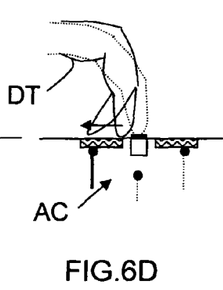

Reference will be made first of all to FIGS. 1 to 3 for presenting an embodiment of a device for controlling the carrying out of instructions D according to the invention. As shown in FIG. 1, a device D of this kind comprises at least one receptacle RP, storage means MS and a control module MC.

The receptacle RP is preferably of the ergonomic type to make it easier for the user to grip and support it with at least one hand. It comprises a front surface FAV (see FIG. 2) and a rear surface FAR (see FIG. 3) provided with a set GAC of rear actuators AC.

Each rear actuator AC is designed to be actuated in accordance with at least one type of actuation which is associated with an instruction which, when carried out, is capable of bringing about a change to at least some of the images and/or alphanumeric characters which are displayed on at least one screen EC1 and which relate to at least one application, or the emission of at least one sound, or the sending or acquisition of data (or signals), optionally via waves (for example in the case of an infra-red remote control).

The rear surface FAR may comprise any type of actuator, i.e. any man-machine interfacing element which, when activated by one of the user's fingers, enables him to supply (or input) an instruction (or command) to be executed. It may therefore be a sensitive (or touch-responsive) key or zone, a push button, a trigger, a "mouse" (or one of its derivatives such as a trackball or touchpad), a scroll bar, a scroll wheel or a lever (or joystick), for example.

The rear surface FAR may, as shown in FIG. 3, comprise foldaway wedges CA to enable it to be placed on a support without these rear actuators AC being in contact with the support.

In the non-restrictive embodiment shown in FIGS. 2 and 3, the device D constitutes an "autonomous" electronic (and/or computer) device, i.e. one that has at least one display screen EC1, such as for example a computer or terminal (fixed or portable), optionally reinforced and/or waterproof, or a personal digital assistant (or PDA), or communications equipment such as a mobile (or cordless) telephone or satellite navigation apparatus (for example of the GPS type). However, the invention is not limited to this type of electronic (and/or computer) equipment. In fact it relates to any electronic (and/or computer) equipment comprising at least rear actuators and a control module (for example forming part of (or constituting) an operating system (or OS)) which is tasked with controlling the execution of the instructions activated by the actuation of the actuators. It may therefore also be a man-machine interface (such as a peripheral of the keyboard type, optionally designed to be connected to a computer), a games console, a remote-control box for electronic equipment, a multimedia content reader, measuring equipment, or an electronic book or dictionary. It will therefore be understood that a device D according to the invention may be connected, by wires or waves, to electronic (and/or computer) equipment, in order to control (at least partly) what is to be displayed on the screen (EC1) of the latter when it runs an application.

In view of the autonomous nature of the device shown, it comprises on its front surface FAV at least one screen EC1 tasked with displaying images and/or alphanumeric characters relating to at least one application (for example a game, an electronic diary, electronic messaging, a telephone application, an Internet connection application, an Internet shopping application, or an application for selecting and/or processing photographs).

As shown, although this is not obligatory, the front surface FAV may also comprise a set GAA of at least one front actuator AA which may be actuated in accordance with at least one type of actuation associated with an instruction (or action) to be carried out. Moreover, the receptacle RP may optionally comprise on a side surface at least one side actuator that can be actuated in accordance with at least one type of actuation associated with an instruction (or action) to be carried out.

The front surface FAV and/or a side surface may comprise any type of actuator (as defined hereinbefore). This may therefore be a touch zone, a push button, a mouse (or one of its derivatives such as a trackball or touchpad), a trigger, a scroll bar, a scroll wheel, a lever (or joystick), or a sensitive (or touch-responsive) key defined in a touch zone ET which has for example screen printing associated with keys and showing up thanks to suitable lighting (as in the case of a multi-mode touchpad of a laptop computer), for example.

As an illustration, at least one of the front actuators AA, ET and/or the side actuators may be tasked with controlling the movement of a mouse pointer or a cursor.

The storage means MS are tasked with storing, for at least one application, a correlation table between at least one operating mode and a set of chosen instructions associated with icons of relative positions defined by a selected arrangement.

The term "icon" here denotes an image (displayed or screen-printed) and/or a text zone and/or a set of at least one alphabetical or numeric character and/or a syntactic symbol.

It will be noted that where there are a number of correlation tables, these may optionally together form a general correlation table.

These storage means MS may take any desired form and particularly the form of a memory or a database. It will be noted that in certain operating modes (for example in the "context" mode) some correlation tables may be defined by an application, which may optionally be remote (accessible for example via a communication network, possibly the Internet). In this case, the correlation table is transmitted to the equipment that is coupled to (or that comprises or constitutes) the device D, and the icons of this correlation table are loaded dynamically onto the screen under the control of the application.

It will also be noted, as is the case in the bottom right-hand part of the non-restrictive embodiment in FIG. 2, that the front surface FAV may optionally be provided with static inscriptions (for example screen-printed and optionally backlit and/or accompanied by an LED to indication activation/deactivation) which represent the icons for instructions that are associated with a subset of rear actuators AC in at least one operating mode of at least one application.

It will also be noted that a rear actuator AC may be activated according to a single type of actuation. However, with the aim of reducing the number of them on the rear surface FAR, it is preferable that a rear actuator AC should be capable of being actuated according to at least two and, if possible, three types of actuation which are selected from among at least a first type of actuation triggered by a substantially vertical action (a) of a finger, a second type of actuation triggered by the extension (e) of a finger, and a third type of actuation triggered by the retraction (r) of a finger. However, it will be noted that it is possible to envisage using actuators that can be actuated according to more than three types of actuation.

FIGS. 4 to 6 show three examples of actuators AC that can be actuated according to three different types of actuation. More precisely, the embodiment in FIG. 4 illustrates an actuator AC which takes the form of a stick with three contacts. When the finger DT does not act on the central actuating stud (see FIG. 4A), nothing happens. When the finger DT exerts substantially vertical pressure on the central actuating stud (see FIG. 4B) it actuates the bottom contact, which activates the instruction associated therewith (taking into account the application and operating mode selected). When the finger DT is extended forwards (see FIG. 4C) it causes the central actuating stud to rotate, which activates the rear contact and thereby activates the instruction associated therewith (taking into account the application and operating mode selected). When the finger DT is retracted backwards (see FIG. 4D) it causes the central actuating stud to rotate, which operates the front contact and hence activates the instruction associated therewith (taking into account the application and operating mode selected).

The embodiment in FIG. 5 illustrates an actuator AC with three push-buttons. When the finger DT does not act on a push button (see FIG. 5A), nothing happens. When the finger DT exerts substantially vertical pressure on the bottom push button (see FIG. 5B) it activates the instruction associated therewith (taking into account the application and operating mode selected). When the finger DT is extended forwards (see FIG. 5C) it exerts pressure on the front push button, which activates the instruction associated therewith (taking into account the application and operating mode selected). When the finger DT is retracted backwards (see FIG. 5D) it exerts pressure on the rear push button, which activates the instruction associated therewith (taking into account the application and operating mode selected).

The embodiment in FIG. 6 illustrates an actuator AC with one push button and two touch zones. When the finger DT does not act on a push button or a touch zone (see FIG. 6A), nothing happens. When the finger DT exerts substantially vertical pressure on the bottom push button (see FIG. 6B) this activates the instruction associated therewith (taking into account the application and operating mode selected). When the finger DT is extended forwards (see FIG. 6C) it makes sliding directional contact with the front touch zone, which activates the instruction associated therewith (taking into account the application and operating mode selected). When the finger DT is retracted backwards (see FIG. 6D) it makes sliding directional contact with the rear touch zone, which activates the instruction associated therewith (taking into account the application and operating mode selected).

Of course, any other type of actuator may be used. Thus, at least some of the rear actuators AC may be subdivided into at least two sub-actuators each having only one type of actuation (for example contacts or push buttons). In this case, the sub-actuators of the same actuator may optionally have different shapes depending on their positions relative to the rear surface FAR. As a non-restrictive example, each rear actuator AC may be made up of three sub-actuators of the push button type.

The number of rear actuators AC and their type(s) depend on the applications for which they act.

For example, the rear surface FAR may comprise a first group GG of at least one rear actuator AC assigned to the fingers of the user's left hand. These rear actuators AC of the first group GG may for example be placed on the rear surface FAR one above the other in positions that match the average natural positions of the fingers of the left hand.

Alternatively or additionally, the rear surface FAR may comprise a second group GD of at least one rear actuator AC assigned to the fingers of the user's right hand. These rear actuators AC of the second group GD may for example be placed on the rear surface FAR one above the other in positions that match the average natural positions of the fingers of the right hand.

Figure 7:
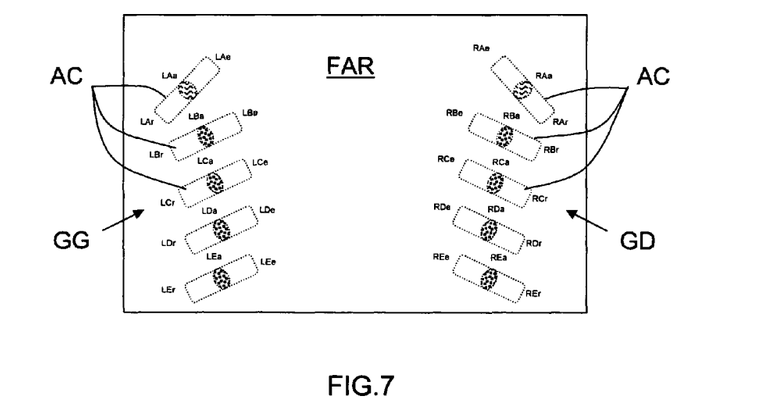

It will be noted that in the non-restrictive example shown in FIGS. 3 and 7, the device D comprises a first group GG of five rear actuators AC and a second group GD of five rear actuators AC. However, the number of groups may be equal to one and the number of rear actuators AC in each group must be at least equal to one and preferably less than eight. One advantageous implementation would consist in using the first GG and second GD groups each comprising four rear actuators for the index, second, ring finger and little finger, respectively, the thumb then being reserved for gripping the receptacle RP and actuating any front actuators AA and/or side actuators.

In the non-restrictive example shown in FIG. 7, the capital letters L and R respectively designate the rear actuators AC of the first GG and second GD groups, the capital letters A to E denote the five rear actuators AC of the same group GG or GD, and the small letters a, e and r respectively designate the three types of actuation of each rear actuator AC (namely pressing (a), extension (e) and retraction (r)). For example, the reference LDr denotes the fourth rear actuator D of the first group GG when it is actuated according to the third type of actuation corresponding to the retraction (r) of the finger.

It is important to note that the rear actuators AC of the same group GG or GD may be of the same or different types depending on the needs of the application. Similarly the rear actuators AC of different groups may be of the same or different types depending on the needs of the application.

It will also be noted that at least some of the rear actuators AC may be provided with specific three-dimensional markings and/or a particular covering (for example a smooth covering and a rough covering, or a plastic or silicone covering and a leather covering) which are intended to differentiate them from one another and/or to make it easier for the user to position his or her fingers.

Figure 8:
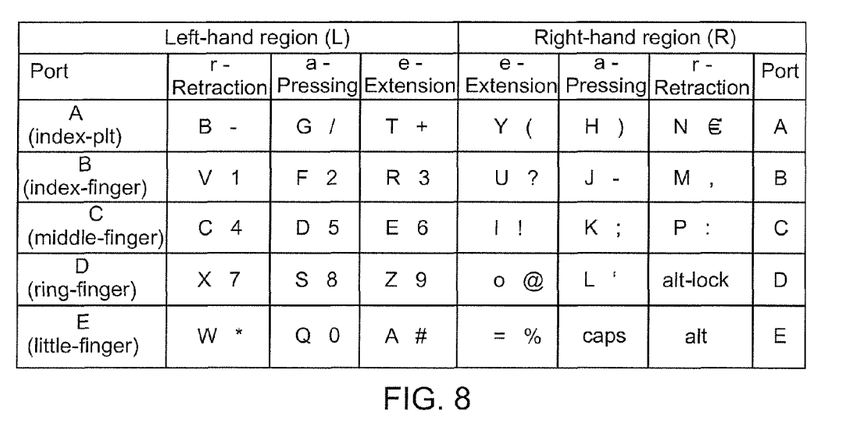
FIG. 8 shows an example of a correlation table adapted to an "alpha" operating mode.

FIG. 8 shows a first non-restrictive embodiment of a correlation table adapted to an operating mode known as "alpha", intended for inputting alphanumeric characters, for a device D comprising first GG (L) and second GD (R) groups of five rear actuators AC (A to E) with three types of actuation (a, e and r), of the type shown in FIGS. 3 and 7.

In the example in FIG. 8, for each type of actuation of each rear actuator AC, the main character produced is shown in bold and in the first position, and the possible alternative character is shown in italics in the second position. In the case of a letter, it is produced in lower case, for example (even though it is shown in capitals in FIG. 8) unless the instruction caps has been activated or is already on, for example. The instruction alt may for example make it possible to change the activated instruction by activating the associated alternative character. The instruction caps may for example make it possible to put the next alphabetical character activated into capital letters. The instruction alt-lock for example enables the alternative characters to be locked on as main characters and vice versa.

Figure 9:
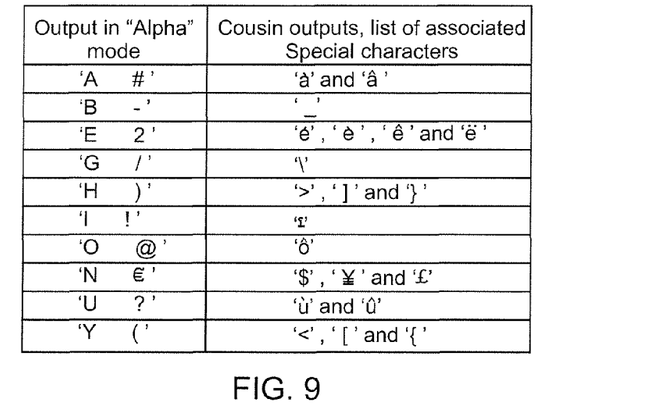
FIG. 9 shows an example of a correlation table adapted to a case of the use of a dedicated function of proposing "cousin" instructions (or derived instructions) in the alpha operating mode.

FIG. 9 shows a non-restrictive example of a correlation table adapted to the use of a dedicated function of proposing instructions which are "cousins" to (or derived from) certain instructions associated with certain rear actuators in FIG. 7 in the alpha operating mode. This dedicated function is proposed for example in the event of actuation of the dedicated key TD of the front surface FAV.

This dedicated function makes it possible to provide the user, who has just actuated a rear actuator AC in accordance with a certain type of actuation in a given operating mode, with an instruction that is termed a cousin to the instruction that he has just activated. A list of cousin (or derived) instructions is therefore associated with a list of instructions of the operating mode in question and the actuation of the front actuator TD calls up the instruction that is the cousin to the one that has just been activated in the correlation table in question. Typically the cousin instruction will be found to be the instruction corresponding to a neighbouring instruction which could be obtained by another movement of the finger, or an associated instruction such as an upper-case letter in the case of a lower-case letter and vice versa, or an accented letter "é", "è", "ê" or "ë" when the letter "e" is operated, or an instruction associated with the same actuation in another operating mode or sub-mode.

For example, when the front actuator TD is actuated in the alpha mode, this may activate, on each depression, automatic backward movement by deleting a character ("backspace") and activation of the cousin instruction taken in order in the list, i.e. the alternative character, then the special characters for the letters in question (see FIG. 9), then the upper-case character.

Figure 10:
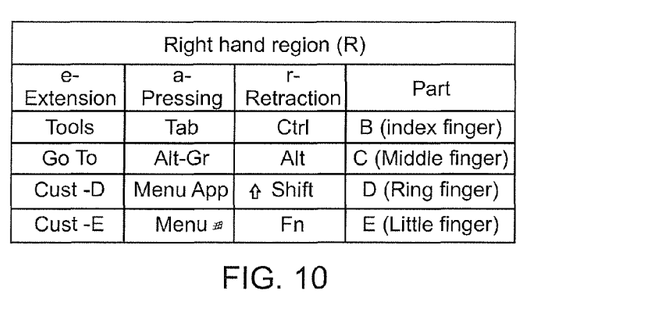
FIG. 10 shows an example of a correlation table adapted to an "advanced" operating mode.

FIG. 10 shows another non-restrictive example of a correlation table adapted to an operating mode known as "advanced", in which four rear actuators AC (B to E) are used with three types of actuation (a, e and r) forming part of a second group GD (R).

For example, in the advanced mode, the actions on the rear actuators AC assigned to the right hand may make it possible to specify a sub-mode that implements a table of instructions that are specific to the rear actuators AC assigned to the left hand or the launching of instructions and commands that are specific to the operating system.

In the example shown in FIG. 10, the sub-modes "GoTo" and "Tools" correspond for example to instructions sent to the operating system which is then able to change the activity in progress on the equipment in question (in this case the device D) by activating, for example, an application window or a desktop, optionally in overlay, and by ordering a transition to the "context" operating mode in order to follow up the choices within this new application via lists of options.

For example, the instruction "GoTo" may offer the user a list of options of the last applications launched, for the left hand, and a list of the last documents consulted, for the right hand.

For example, the instruction "Tools" may offer the user an application of quick data entry as would be done using a "post-it", but with structuring of the information, indicating its nature by means of lists of the options that can be activated by the rear actuators AC.

For example, the instructions "Cust-D" and "Cust-E" may make it possible to personalise an operating sub-mode of the rear actuators AC of the left hand by defining the characters or character sequence as instructions associated therewith, or to personalise the launch of a particular application. By way of example, character sequences are used as instructions for applications that require formatting markers to be written into a raw text, as in HTML, Latex, Wild or Spip code. It will be noted that light-emitting diodes (or LEDs) may be provided on the front surface FAV so as to indicate to the user an active sub-mode in advanced mode.

The Table shown in FIG. 10 and assigned to the right hand may be associated with a number of "sub-tables" assigned to the left hand and displayed on the screen EC2, for example in advanced mode. Three examples of such sub-tables corresponding to three sub-modes referred to as "alphabetical", "numerical" (or Num) and "symbol" (or Sym) are shown in a non-restrictive manner in FIG. 11.

Figure 11:
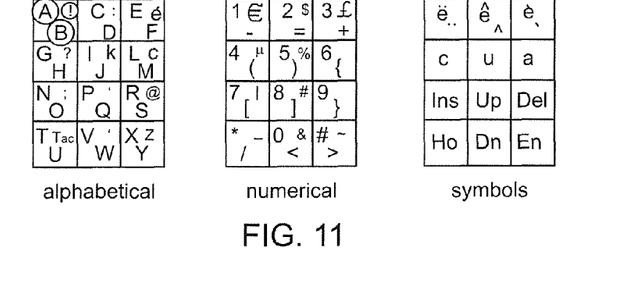

For example, the sub-table that is associated with the alphabetical sub-mode comprises in each box (among the twelve in the example), associated with one type of actuation of a rear actuator AC, a main character in the top left-hand corner (activated by simply pressing, for example), a secondary character in the bottom right-hand corner (activated by a double-press within a short period of time, for example) and a cousin character obtained by actuating a rear actuator followed by actuation of the dedicated actuator TD.

For example, these three sub-modes of the advanced mode may be selected using the thumb by means of at least one front actuator AA.

It will be noted that the device D may optionally provide a complementary function of predictive text input by means of a dictionary of common words. This function may for example be offered to the user as soon as the control module MC identifies a subset of a number of letters joined together. The suggestion may for example be provided by means of an indicator light (or LED) located close to the front actuator AA marked as "magnifier". For example, a brief press on the front actuator "Magnifier" causes a switch to a sub-mode "Supplementary" which provides the user with a list of words or parts of words (number of elements in the list equal to 4, 8 or 12, optionally freely selectable in a variable format) from which he can make a selection using a rear actuator AC.

The context mode is intended for example to supply instructions which correspond to actions proposed by the active (optionally remote) application. In context mode, the instructions (or actions) are those that are required by the application or possibly the operating system for the equipment (in this case the device D) if there is no active application. The actions are linked to images displayed in the window of the application or in transparent overlay over the entire screen by an image substituted for the desktop (for example). There are a great many types of use, notably as a function of the embodiments defined by the application editors.

It will be noted that any operating mode associated with one application and intended to associate specific instructions (or actions) to types of actuations of actuators may be envisaged. Moreover, it will be noted that the number of rear actuators AC used may vary from one operating mode to another. This is the case in particular with the example in FIG. 10 which uses only four out of the five rear actuators AC (B to E) in the alpha mode.

The shifts in operating mode are controlled by the software. They may be configured differently to suit particular needs by pressing on the front actuators AA and/or rear actuators AC and/or on the data that emerge from the application or the operating system and/or on a state memory of the modes activated previously.

The examples provided hereinbefore of correlation between operating modes, types of actuation and instructions (including cousins) are given purely as an illustration. They may be adapted as a function of the needs of the application or even local needs (personalisation requirements). Moreover, it will be understood that it is possible to reverse the roles assigned to the hands and/or to limit the number of instructions as a function of the number of fingers used by the user and/or to reconfigure the arrangement of the modes, sub-modes and actions. As in the case of a standard keyboard (with 104 keys) for which there are numerous variations for different geographical regions and languages, there are a great many possible arrangements.

Preferably, at least some of the associations (correlation (sub-)tables) may be modified by software so as to enable the user to create his own configuration by optionally pressing reference configurations as a function of his language and geographical area.

The control module MC of the device D according to the invention has two main functions.

A first main function comprises, when one operating mode of an application has been selected, identifying within the storage means MS the table that corresponds to it, then associating the instructions contained within this specified table with types of actuation of rear actuators AC which are selected as a function of the relative positions of the icons that are respectively associated with these instructions.

At least some of the icons of the operating mode selected are displayed on at least one screen EC1 and/or EC2 depending on their arrangement which is defined in their correlation table, so as to make it possible to represent (or image) the relative positions of the rear actuators AC on the rear surface FAR and the types of actuation associated with these icons.

There is not necessarily any geometric relationship between the icons and the rear actuators AC associated with them. In other words, the forms and dimensions of the icons may be different from the forms and dimensions of the parts of the rear actuators AC associated with them.

It will be understood that when certain icons are defined by the active application, the instructions corresponding to these icons are managed by the control module MC which is then tasked with associating them with rear actuators AC selected as a function of the relative positions of the corresponding icons on the screen (generally in the application window) and as a function of the relative actual positions of said rear actuators AC. This case arises for example in the context mode.

It will also be understood that the icons may be displayed either on the "main" screen EC1 of the device D and/or on at least one "auxiliary" screen EC2 assigned to this purpose, if the device D has one on its front surface FAV, or on the screen of the electronic and/or computer equipment to which the device D is coupled. In the non-restrictive embodiment shown in FIG. 3, the device D comprises on its front surface FAV an auxiliary screen EC2 of this kind (here, it is assigned to the rear actuators AC of the left and right hands, but could be assigned solely to the rear actuators of the right hand or solely to the rear actuators of the left hand). It would also be possible to provide two auxiliary screens for each of the groups of rear actuators GG and GD.

The second screen (EC2) may be a touch screen, in particular, and/or may form part of a removable electronic sub-assembly that on the one hand operates autonomously and on the other hand operates in conjunction with the device D. The sub-assembly may be for example a portable telephone, a remote controller or a multimedia reader. A removable electronic sub-assembly of this kind may then fit into the device D to perform the functions of displaying the icons, in particular.

It is important to note that the arrangement of the icons and the association of the instructions with the rear actuators AC which is defined by the control module MC are intended to provide the user with an intuitive association between the relative spatial positions of the icons associated with the rear actuators AC, displayed on the front surface FAV, and the relative positions of the rear actuators AC which are located on the rear surface FAR. It will be understood that this representation of the actuators is not necessarily either to scale or necessarily superimposed ("transparent" effect) over the rear actuators AC. The objective of this representation is to provide sufficient useful information on the front surface FAV to enable the rear actuators AC to be used, without occupying very much space on the front surface FAV, so as to leave the maximum area available for displaying the application.

Figure 12:
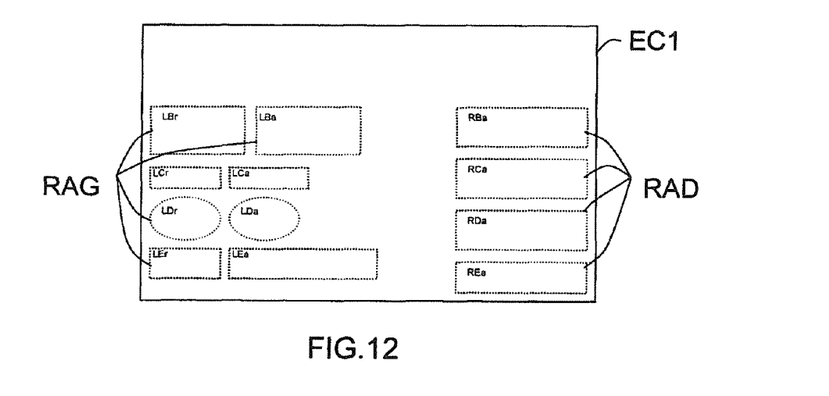

FIG. 12 schematically shows a first embodiment of the display, for example over the entire main screen EC1, on the one hand, of icons RAD representing the types of actuation of four rear actuators AC (B to E) of the second group GD, and, on the other hand, of icons RAG representing the types of actuation of four rear actuators AC (B to E) of the first group GG. It will be understood that here the four rear actuators AC (B to E) of the second group GD can only be actuated according to a single type of actuation (substantially vertical action of the finger (a)), whereas the four rear actuators AC (B to E) of the first group GG may be actuated according to two type of actuation (substantially vertical action of the finger (a) and retraction of the finger (r)).

Figure 13:
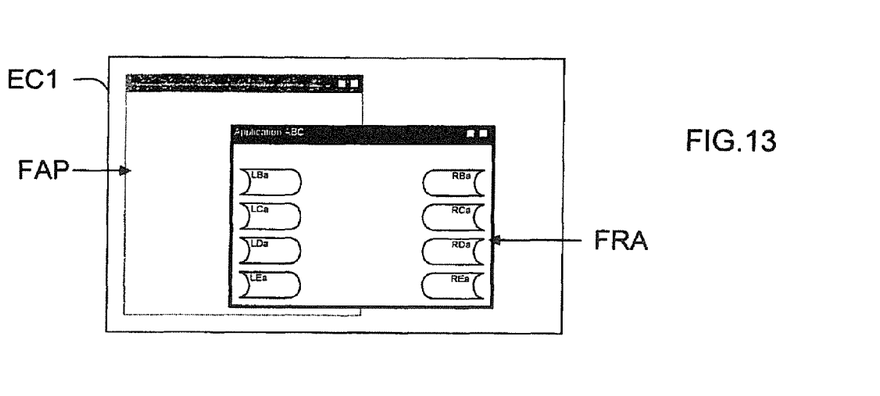

FIG. 13 schematically shows a second example of the display, for example within an application window FRA of the main screen EC1 which is active on top of another application window FAP, on the one hand, of icons RAD representing the types of actuation of four rear actuators AC (B to E) of the second group GD, and, on the other hand, of icons RAG representing the types of actuation of four rear actuators AC (B to E) of the first group GG. It will be understood that here the four rear actuators AC (B to E) of the first and second groups GG and GD, respectively, can only be actuated according to a single type of actuation (substantially vertical action of the finger (a)).

A second main function of the control module MC consists, when a chosen rear actuator AC has been selected manually according to one type of actuation, in commanding the carrying out of the instruction which is associated with the type of actuation of this rear actuator AC.

The device D may optionally propose an actuator known as "View" which is intended to superimpose or overlay (or highlight) on the main screen EC1 the icons that at any given moment represent the rear actuators AC (and their types of actuation) that may be used. This View actuator may for example be placed on the front surface FAV of the receptacle RP, as shown in FIG. 3 (where it is represented by a hand).

Figure 14:
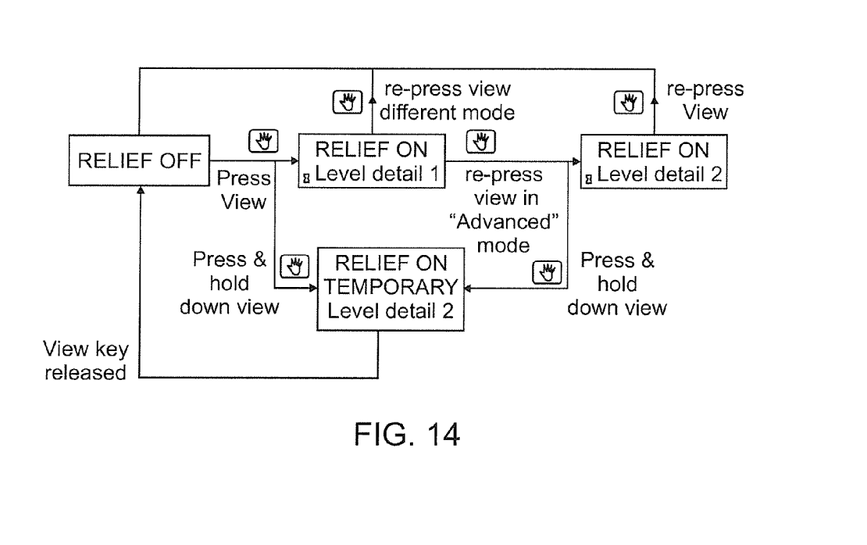

FIG. 14 diagrammatically shows a non-restrictive example of the use of the View actuator. Moreover, the highlighting mode may optionally be personalised. In the embodiment shown in FIG. 14, a short press is used to change from a display in relief ("RELIEF ON"—i.e. with a display overlaid) to a display without relief ("RELIEF OFF") and vice versa. A longer press, when the display is without relief, may for example be used to change to a display with relief for the length of time the actuator is pressed, then to return to the mode without relief as soon as the View actuator is released. It will be noted that putting into relief may optionally vary depending on the operating mode selected.

For example, in the alpha or advanced mode, when the display relief is deactivated, the main screen EC1 does not shown an icon representing a rear actuator AC. LEDs and/or at least one auxiliary screen EC2 may be used to supply information to the user.

For example, in the context mode, when the display relief is deactivated, the icons representing the rear actuators AC that can be used may be displayed in the window of the application with the distinctive logos chosen by the editors of the application.

For example, in alpha or advanced mode, when the user requests relief-on, depending on the configuration options, it is possible to find two display modes for the actions, by reserving one or more zones on the main screen EC1 or by having an overlaid display with a transparent effect. For the advanced mode, one software option may make it possible to modify the display of the icons representing the rear actuators AC of the right-hand region to avoid using up too much visual application space. The icons representing the rear actuators AC of the right-hand region may then only be displayed if the user double-clicks on the View actuator or holds it down (long click), for example.

For example, in the context mode, when the user requests relief-on, the icons representing the rear actuators AC that can be used may be redrawn so as to be more clearly visible (brighter colour(s) and/or different size(s)), while the rest of the display (application window and/or desktop) may be darkened with a possible transparent effect.

Two examples of the use of the device D in context mode are described below with reference to FIGS. 15 to 18.

Figure 15:
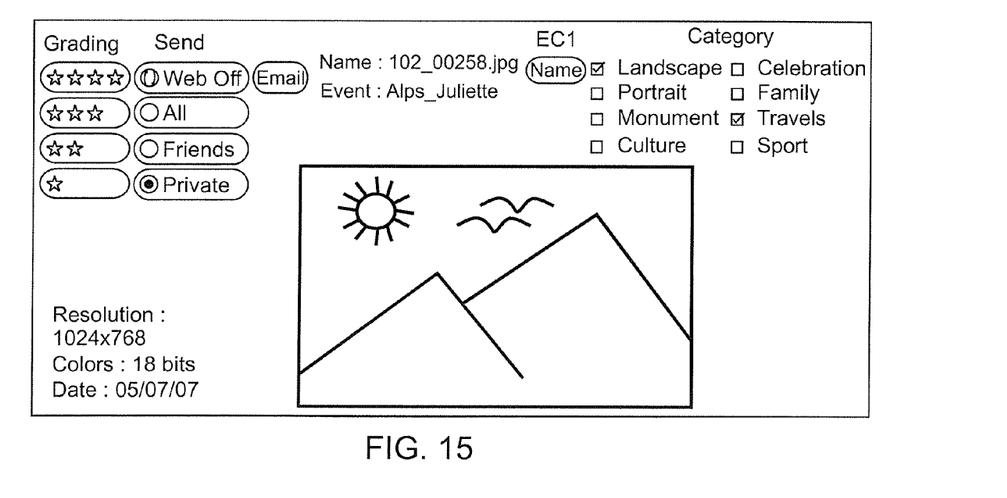
Figure 16:
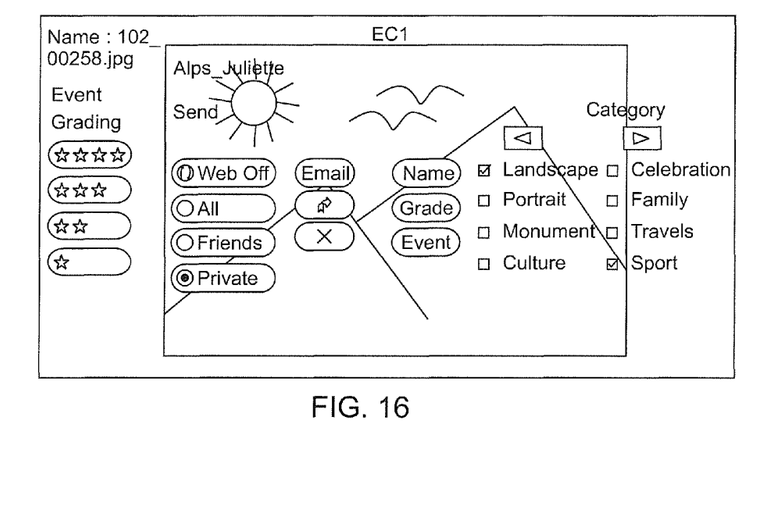

A first use, shown in FIGS. 15 and 16, relates to an application of sorting photos loaded into a directory. This application makes it possible for example to navigate around the photos using the directional arrows of front actuators AA, while carrying out actions by activating instructions using rear actuators AC. For example, it is possible to attach a note to a photo and/or specify conditions for sharing and sending and/or whether or not to insert the photo in a website and/or to give the photo a name and/or associate it with an event and/or assign a category to the photo. In the non-relief mode shown in FIG. 15, different attributes may be shown in small type in the form of list(s) of choices either side of the photo. In the relief-on mode shown in FIG. 16, the photo may be placed in the background while the attributes may be shown in the foreground (in overlay) (and optionally in transparent form) and enlarged to assist the user.

This example shows both the lists of choices with exclusive elements shown up by prolonged displaying (as in the "Grading" section) or by the radio button (as in the "Send" section). This example also shows elements that may switch between a number of states (as in the "Web Off/Web On" icon). This example also shows multiple-choice selection lists with boxes to tick (as in the "Category" section). Some actions also give access to other options such as the "Name" and "Event" icons which may for example cause the "Category" section to be replaced by another list of choices in order to determine a name and an event, respectively, to be attached to the photo. The action represented by the "Note" icon may for example open up an input zone with transition into alpha mode for annotating the photo. Once this annotation has been done it is possible for example to switch back into the context mode.

In the case of a display with relief ("Relief ON"), additional icons may optionally be brought into use to indicate certain actions. For example, the arrows for navigating in the Category section or the actions "Note" or "Event" may be added.

Figure 17:
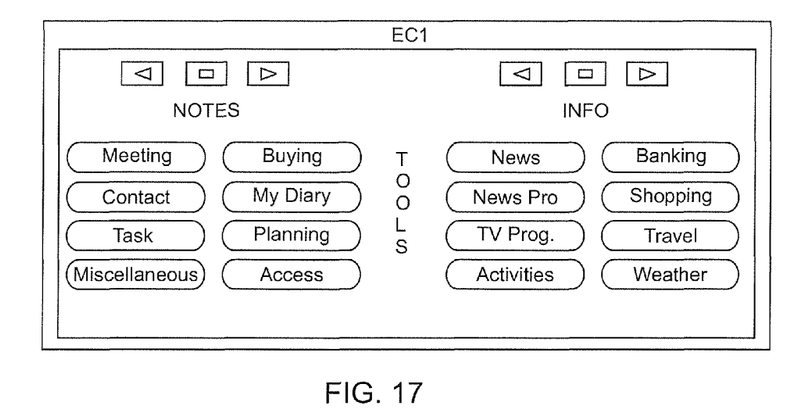
Figure 18:
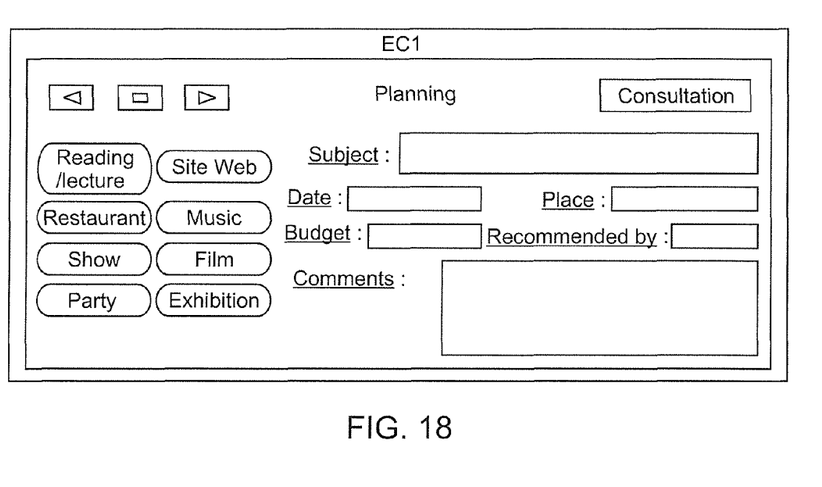

A second use, shown in FIGS. 17 and 18, relates to an application of quick data entry and/or looking-up in the context mode. The "Tools" window shown in FIG. 17 makes it possible, by means of context menus, to label items of information rapidly to assist with inputting and monitoring of consistency. The "Notes" region gives access to screens that show an inputting form and the "Info" region provides personalised links to Internet pages of information on different subjects (privileged access to favourites). The "Planning" form shown in FIG. 18 is an inputting form. For example, rear actuators AC assigned to the right hand make it possible to position the cursor in input zones. This positioning action may for example automatically cause the context mode to switch to the alpha mode for a free-access field or to the advanced/Num mode for a date field. In the cursor mode with text, pressing the context key may for example switch back to the context mode but this time not at the global application level but at the input zone level, and may for example suggest logical input options, for example from a contact list for the field "Recommended by".

During the inputting of information that requires a number of fields to be completed, the double use of the rear actuators AC to carry out both pointing operations and the inputting of characters or symbols makes the work easier and more efficient for the user. The latter benefits from an ergonomic and comfortable method of inputting alphanumeric characters without having to move their hands from the keypad to a stylus or mouse in order to carry out the entry operations.

A great many other examples of applications may be envisaged, notably telephone, electronic messaging, Internet connection or e-shopping applications. Within the application window of a web browser, options (hypertext link, selection icon for an electronic shopping trolley, and the like) may be displayed and "clicked on" (or selected) directly via the rear actuators AC (without using a stylus or a mouse pointer) as a function of the position relative to the display of these proposed options.

It will be noted that the receptacle RP may comprise a first opening arranged so as to make it easier for the user to support it with one hand. In an alternative embodiment, it may comprise first and second openings arranged to make it easier for the user to support it with the right and left hands, respectively. Each opening may for example be an indentation suitably shaped to accommodate the part of the hand that is at the intersection between the thumb and index finger.

In addition the device D may optionally comprise detection means tasked with detecting the presence of at least one of the user's hands in a zone that enables him to support the receptacle RP and access at least some of the rear actuators AC, and not to allow the control module MC to take note of an activated instruction unless the presence of the hand is detected.

Moreover, the device D may for example have a centre of gravity which is located in a lower part in relation to a virtual horizontal line defining the middle of its receptacle RP.

The control module MC, and optionally the storage means MS, may be made in the form of software (or data) modules, electronic circuits (or hardware), or a combination of circuits and software.

The invention is not limited to the embodiments of the device for controlling the execution of instructions and electronic and/or computer equipment described hereinbefore, solely by way of example, but encompasses all the variants that may be envisaged by the skilled man within the scope of the claims that follow.

The invention claimed is:

1. A device for controlling execution of instructions comprising:
   a receptacle supportable by a user with at least one hand and having a front surface and a rear surface provided with rear actuators each of the rear actuators arranged to be actuated according to at least one type of actuation associated with an instruction that is to be carried out in relation to at least one application;
   storage means capable of storing, for said at least one application, a correlation table between at least one operating mode and a set of selected instructions associated with icons of relative positions defined by a chosen arrangement; and
   control means configured to identify within said storage means the table that corresponds thereto, once an operating mode of an application has been selected, to associate the instructions contained within said identified table with types of actuation of rear actuators selected as a function of the relative positions of the icons associated respectively with said instructions, at least some of said icons being displayed on at least one screen according to their chosen arrangement to demonstrate relative positions on said rear surface of the rear actuators and the types of actuation associated, wherein the control means is further configured in the case of manual actuation in accordance with a type of actuation of a selected rear actuator, to order the execution of the instruction associated with said type of actuation of said rear actuator, and wherein each rear actuator is configured to be actuated in accordance with at least two types of actuations selected from a first type of actuation triggered by a substantially vertical action of a finger, a second type of actuation triggered by extension of a finger, and a third type of actuation triggered by retraction of a finger.

2. Device according to claim 1, wherein said rear surface comprises a first set of at least one rear actuator assigned to the fingers of a user's left hand.

3. Device according to claim 2, wherein one of said rear actuators of the first set is placed on said rear surface above another rear actuator of the first set in positions that match average natural positions of the fingers of the user's left hand.

4. Device according to claim 1, wherein the rear surface comprises a second set of at least one rear actuator assigned to the fingers of a user's right hand.

5. Device according to claim 4, wherein said rear actuators of the second set is placed on said rear surface above another rear actuator of the second set in positions that match average natural positions of the fingers of the user's right hand.

6. Device according to claim 1, wherein said storage means is configured to store at least one correlation table sent by at least one local or remote application.

7. Device according to claim 1, wherein said front surface includes a first screen adapted to display said icons.

8. Device according to claim 7, wherein said first screen is adapted to display images and/or alphanumeric characters of the selected application.

9. Device according to claim 7, wherein said front surface includes at least one second screen adapted to display images and/or alphanumeric characters of the selected application and said icons in certain operating modes.

10. Device according to claim 1, wherein said front surface includes printed static information representing instruction icons associated with a subset of rear actuators in at least one operating mode of at least one application.

11. Device according to claim 1, wherein at least some of said rear actuators include three-dimensional markings and/or a covering configured to differentiate said at least some of said rear actuators from one another and/or facilitate the placing of the fingers.

12. Device according to claim 1, wherein at least some of the rear actuators are associated with at least one type of actuation subdivided into at least two subtypes of actuation associated with different instructions.

13. Device according to claim 1, wherein the front surface includes at least one front actuator configured to be actuated in accordance with at least one type of actuation associated with an instruction.

14. Device according to claim 13, wherein at least one of the front actuators and the side actuators is adapted to control movement of a mouse pointer and/or a cursor.

15. Device according to claim 1, further comprising a side surface provided with at least one side actuator configured to be actuated in accordance with at least one type of actuation associated with an instruction.

16. Device according to claim 1, wherein one of the rear actuators, the front actuators and/or the side actuators is adapted to select one operating mode from at least two operating modes selected from a group consisting of at least one input mode in which at least some of the instructions correspond to alphanumeric characters, a context mode in which at least some of the instructions correspond to actions pertaining to an application, and an advanced mode in which at least some of the instructions are adapted to allow a temporary change in application, operating mode and/or display mode.

17. Device according to claim 1, wherein one of the rear actuators, front actuators and/or side actuators are adapted to associate with at least some of the types of actuation associated with at least some of the rear actuators, instructions derived from the last instruction carried out.

18. Device according to claim 1, wherein the device constitutes a peripheral of a piece of electronic and/or computer equipment.

19. An electronic equipment comprising the device of claim 1 for controlling the carrying out of said instructions.

* * * * *